(12) United States Patent
Kim et al.

(10) Patent No.: US 9,131,274 B2
(45) Date of Patent: Sep. 8, 2015

(54) METHOD FOR TRANSCEIVING MEDIA FILES AND DEVICE FOR TRANSMITTING/RECEIVING USING SAME

(75) Inventors: Kyungho Kim, Seoul (KR); Hyeonjae Lee, Seoul (KR); Waqar Zia, Munich (DE)

(73) Assignee: LG ELECTRONICS INC., Seoul (KR)

( * ) Notice: Subject to any disclaimer, the term of this patent is extended or adjusted under 35 U.S.C. 154(b) by 318 days.

(21) Appl. No.: 13/811,198

(22) PCT Filed: Jul. 19, 2011

(86) PCT No.: PCT/KR2011/005307
§ 371 (c)(1),
(2), (4) Date: Jan. 24, 2013

(87) PCT Pub. No.: WO2012/011724
PCT Pub. Date: Jan. 26, 2012

(65) Prior Publication Data
US 2013/0125187 A1    May 16, 2013

Related U.S. Application Data

(60) Provisional application No. 61/365,746, filed on Jul. 19, 2010, provisional application No. 61/453,948, filed on Mar. 17, 2011.

(51) Int. Cl.
*H04N 7/12* (2006.01)
*H04N 21/462* (2011.01)
*H04N 21/236* (2011.01)
(Continued)

(52) U.S. Cl.
CPC ..... *H04N 21/4622* (2013.01); *H04N 21/23608* (2013.01); *H04N 21/4307* (2013.01); *H04N 21/8547* (2013.01); *H04N 21/85406* (2013.01);
(Continued)

(58) Field of Classification Search
None
See application file for complete search history.

(56) References Cited

U.S. PATENT DOCUMENTS

2010/0135646 A1* 6/2010 Bang et al. .................... 386/124
2011/0239078 A1* 9/2011 Luby et al. .................... 714/752

FOREIGN PATENT DOCUMENTS

CN          101188589 A      5/2008
CN          101282230 A      10/2008
(Continued)

OTHER PUBLICATIONS

Haakon Riiser et al: "Low overhead container format for adaptive streaming", Proceedings of the First Annual ACM SIGMM Conference on Multimedia Systems, MMSYS'10, Jan. 1, 2010, p. 193, XP055028059, New York, New York, USA DOI: 101145/17308361730859 ISBN: 978-1-60-558914-5.
(Continued)

*Primary Examiner* — Christopher S Kelley
*Assistant Examiner* — Christopher Findley
(74) *Attorney, Agent, or Firm* — Dentons US LLP

(57) ABSTRACT

A method and apparatus for transmitting and receiving an MPEG-2 TS-based media file are provided. In the method of transmitting an MPEG2 Transport Stream (TS)-based media file, a Presentation Time Stamp (PTS) of a Presentation Unit (PU) is mapped to a Media Presentation Time (MPT) for synchronization with other media with respect to at least one program element forming a program included in the media file; and synchronization information including the mapped media presentation time is transmitted together with the media file, wherein the media presentation time is provided for a first PU in a segment of the transmitted media file.

17 Claims, 21 Drawing Sheets

(51) Int. Cl.
    *H04N 21/43* (2011.01)
    *H04N 21/854* (2011.01)
    *H04N 21/8547* (2011.01)
    *H04N 21/2343* (2011.01)
    *H04N 21/845* (2011.01)

(52) U.S. Cl.
    CPC ...... *H04N 21/23439* (2013.01); *H04N 21/8456* (2013.01)

(56) References Cited

FOREIGN PATENT DOCUMENTS

| KR | 1020060039728 A | 5/2006 |
|----|-----------------|--------|
| KR | 1020060131502 A | 12/2006 |
| KR | 10-2007-0014376 A | 2/2007 |
| KR | 10-0724867 B1 | 6/2007 |
| KR | 1020080090356 A | 10/2008 |
| KR | 10-2009-0107000 A | 10/2009 |
| WO | 2006126852 A1 | 11/2006 |

OTHER PUBLICATIONS

Open IPTV Forum a Release 2 Specification HTTP Adaptive Streaming Draft V0.04.01, 3GPP Draft; OIPF-DR-HAS-VO 04 01-2010-04-23, 3rd Generation Partnership Project (3GPP), Mobile Competence Centre ; 650, Route Des Lucioles ; F-06921 Sophia-Antipolis Cedex; France, vol. SA WG4, No. Vancouver, Canada; Apr. 29, 2010, XP050437971.

* cited by examiner

FIG.9

Box Type: 'm2si'
Container: Segment
Mandatory: Yes
Quantity: One or more

FIG.10

```
aligned(8) class SyncTableBox extends FullBox('m2si', version, flags) {
    // the following entry is optional
    unsigned int(32) timescale;
    unsigned int(32) reference_PID;
    unsigned int(16) program_element_count;
    unsigned int(16) reference_count;
    for (i=1; i<= program_element_count; i++)
    {
        unsigned int(32) PID;

if (version==0)
        {
            unsigned int(32) presentation_time;
        } else
        {
            unsigned int(64) presentation_time;
        }
    }
    for(i=1; i <= reference_count; i++)
    {
        unsigned int(32) reference_offset;
        unsigned int(32) MTPG_duration;
        // the following entry is optional
        unsigned int(32) PTS;
        bit(1)    contains_RAP;
        bit(1)    discontinuity;
        unsigned int(30) RAP_delta_time;
    }
}
```

FIG.11

| Element or Attribute Name | Type (Attribute or Element) | Cardinality | Optionality | Description |
|---|---|---|---|---|
| M2SI | E | 1 | M | Container for the information |
| timescale | A | | O | The timescale of media presentation timeline. If provided more than once within a single media presentation, its value shall be the same for the whole presentation |
| reference_PID | A | 1 | M | Provides the PID of the MPEG-2 TS packets carrying the reference program element. |
| SyncInformation | E | 1...N | M | Provides the presentation time of the first sample of at least the reference program element, possibly other program elements as well |
| PID | A | 1 | M | The PID of the MPEG-2 TS packets carrying the program element for which the presentation_time is provided; exactly one PID in documented here shall be equal to the reference_PID |
| presentation_time | A | 1 | M | The presentation time for the first sample in the program element identified by PID expressed in the timescale |
| ReferenceEntries | E | 1...N | M | It refers to each of the following MTPGs in the segment one after another, starting from the first MTPG |
| reference_offset | A | 1 | M | The distance in bytes from the first byte of the MPEG-2 TS segment, to the first byte of the MTPG referred to by this iteration of the loop |
| MTPG_duration | A | 1 | M | It provides the duration of reference program element for the referred MTPG, expressed in the timescale of the track |
| PTS | A | | O | The MPEG-2 TS PTS of the first PU of the reference program element of this MTPG. |
| discontinuity | A | | O | Set to 1 this MTPG starts with a PTS discontinuity |
| RAP_delta_time | A | 1 | O | Provides the presentation time offset of a random access point (RAP) with respect to the presentation time of the first sample of the reference program element in the segment. |

FIG.12

```xml
<?xml version="1.0" encoding="UTF-8"?>
<xs:schema attributeFormDefault="qualified" elementFormDefault="qualified" xmlns:xs="http://www.w3.org/2001/XMLSchema">
<xs:annotation>Sync Information Document </xs:annotation>
<!--M2SI: Wrapper for information -->
<xs:element name="M2SI">
<xs:attribute name="Timescale" type="xs:nonNegativeInteger" use="optional"/>
<xs:attribute name="reference_PID" type="xs:nonNegativeInteger" use="required"/>
<xs:complexType>
<xs:sequence>
<xs:element minOccurs="1" name="SyncInformation" type="SyncInformationType"/>
</xs:sequence>
</xs:complexType>
<xs:complexType>
<xs:sequence>
<xs:element minOccurs="1" name="ReferenceEntries" type="ReferenceEntriesType"/>
</xs:sequence>
</xs:complexType>
</xs:element>
<!--Data within Sync Infomration -->
<xs:complexType name="SyncInformationType">
<xs:attribute name="PID" type="xs:nonNegativeInteger" use="required"/>
<xs:attribute name="MTPG_duration" type="xs:nonNegativeInteger" use="required"/>
<xs:attribute name="presentation_time" type="xs:nonNegativeInteger" use="required"/>
</xs:complexType>
<!--Data for Reference Entries -->
<xs:complexType name="ReferenceEntriesType">
<xs:attribute name="reference_offset" type="xs:nonNegativeInteger" use="required"/>
<xs:attribute name="MTPG_duration" type="xs:nonNegativeInteger" use="required"/>
<xs:attribute name="discontinuity" type="xs:boolean" use="optional"/>
<xs:attribute name="RAP_delta_time" type="xs:nonNegativeInteger" use="optional"/>
</xs:complexType>
</xs:schema>
```

FIG.13

| styp | m2si | mdat | MPEG-2 TS data |

FIG.16

| Parameter Name | Cardinality | Description |
|---|---|---|
| Segments | 1 | Provides the Segment URL list. |
| InitialisationSegment | 0, 1 | Describes the Initialisation Segment. If not present each Media Segment is self-initialising. |
| URL | 1 | The URL where to access the Initialisation Segment (the client would restrict the URL with a byte range if one is provided in the MPD). |
| MediaSegment | 1...N | Describes the accessible Media Segments. |
| StartTime | 1 | The approximate start time of the Media Segment in the Period relative to the start time of Period. To obtain the start time of the Media Segment in the Media Presentation, the start time of the Period needs to be added for On-Demand services. For live services, in addition also the value of the @availabilityStartTime attribute needs to be added. |
| URL | 1 | The URL where to access the Media Segment (the client would restrict the URL with a byte range if one is provided in the MPD). |
| IndexSegment | 1...N | Describes the accessible Index Segments, if present. |
| URL | 1 | The URL where to access the Index Segment (the client would restrict the URL with a byte range if one is provided in the MPD). |

FIG. 18

```xml
<?xml version="1.0" encoding="UTF-8"?>
<MPD
xmlns:xsi="http://www.w3.org/2001/XMLSchema"
xmlns="urn:mpeg:mpegB:schema:DASH:MPD:DIS2011"
xsi:schemaLocation="urn:mpeg:mpegB:schema:DASH:MPD:DIS2011"
type="OnDemand"
mediaPresentationDuration="PT3256S"
minBufferTime="PT1.2S">
<BaseURL>http://cdn1.example.com/</BaseURL>
<BaseURL>http://cdn2.example.com/</BaseURL>
<Period>
<Group mimeType="video/MP2T">
<Representation bandwidth="256000" width="320" height="240">
<SegmentInfo>
<Url sourceURL="seg-s1-256k-1.mp2t"/>
<Url sourceURL="seg-s1-256k-2.mp2t"/>
<Url sourceURL="seg-s1-256k-3.mp2t"/>
<Index sourceURL="seg-s1-256k-1.isss"/>
<Index sourceURL="seg-s1-256k-2.isss"/>
<Index sourceURL="seg-s1-256k-3.isss"/>
</SegmentInfo>
</Representation>
<Representation bandwidth="512000" width="320" height="240">
<SegmentInfo>
<Url sourceURL="seg-s1-512k-1.mp2t"/>
<Url sourceURL="seg-s1-512k-2.mp2t"/>
<Url sourceURL="seg-s1-512k-3.mp2t"/>
<Url sourceURL="seg-s1-512k-4.mp2t"/>
<Index sourceURL="seg-s1-512k-1.isss"/>
<Index sourceURL="seg-s1-512k-2.isss"/>
<Index sourceURL="seg-s1-512k-3.isss"/>
<Index sourceURL="seg-s1-512k-4.isss"/>
</SegmentInfo>
</Representation>
<Representation bandwidth="1024000" width="640" height="480">
<SegmentInfo>
<Url sourceURL="seg-s1-1024k-1.mp2t"/>
<Url sourceURL="seg-s1-1024k-2.mp2t"/>
<Url sourceURL="seg-s1-1024k-3.mp2t"/>
<Url sourceURL="seg-s1-1024k-4.mp2t"/>
<Url sourceURL="seg-s1-1024k-5.mp2t"/>
<Index sourceURL="seg-s1-1024k-1.isss"/>
<Index sourceURL="seg-s1-1024k-2.isss"/>
<Index sourceURL="seg-s1-1024k-3.isss"/>
<Index sourceURL="seg-s1-1024k-4.isss"/>
<Index sourceURL="seg-s1-1024k-5.isss"/>
</SegmentInfo>
</Representation>
</Group> </Period> </MPD>
```

FIG.19

```
<?xml version="1.0" encoding="UTF-8"?>
<MPD
xmlns:xsi="http://www.w3.org/2001/XMLSchema"
xmlns="urn:mpeg:mpegB:schema:DASH:MPD:DIS2011"
xsi:schemaLocation="urn:mpeg:mpegB:schema:DASH:MPD:DIS2011"
type="OnDemand"
mediaPresentationDuration="PT3256S"
minBufferTime="PT1.2S">
<BaseURL>http://cdn1.example.com/</BaseURL>
<BaseURL>http://cdn2.example.com/</BaseURL>
<Period>
<Group mimeType="video/MP2T">
<Representation bandwidth="256000" width="320" height="240">
<SegmentInfo>
<Url sourceURL="seg-s1-256k-1.dat" range="2049-"/>
<Url sourceURL="seg-s1-256k-2.dat" range="1001-"/>
<Url sourceURL="seg-s1-256k-3.dat" range="2048-"/>
<Index sourceURL="seg-s1-256k-1.dat" range="0-2048"/>
<Index sourceURL="seg-s1-256k-2.dat" range="0-1000"/>
<Index sourceURL="seg-s1-256k-3.dat" range="0-2048"/>
</SegmentInfo>
</Representation>
<Representation bandwidth="512000" width="320" height="240">
<SegmentInfo>
<Url sourceURL="seg-s1-512k-1.dat" range="2011-"/>
<Url sourceURL="seg-s1-512k-2.dat" range="4001-"/>
<Url sourceURL="seg-s1-512k-3.dat" range="3001-"/>
<Url sourceURL="seg-s1-512k-4.dat" range="5001-"/>
<Index sourceURL="seg-s1-512k-1.dat" range="0-2010"/>
<Index sourceURL="seg-s1-512k-2.dat" range="0-4000"/>
<Index sourceURL="seg-s1-512k-3.dat" range="0-3000"/>
<Index sourceURL="seg-s1-512k-4.dat" range="0-5000"/>
</SegmentInfo>
</Representation>
<Representation bandwidth="1024000" width="640" height="480">
<SegmentInfo>
<Url sourceURL="seg-s1-1024k-1.dat" range="5001-"/>
<Url sourceURL="seg-s1-1024k-2.dat" range="6001-"/>
<Url sourceURL="seg-s1-1024k-3.dat" range="4002-"/>
<Url sourceURL="seg-s1-1024k-4.dat" range="3400-"/>
<Url sourceURL="seg-s1-1024k-5.dat" range="7001-"/>
<Index sourceURL="seg-s1-1024k-1.dat" range="0-5000"/>
<Index sourceURL="seg-s1-1024k-2.dat" range="0-6000"/>
<Index sourceURL="seg-s1-1024k-3.dat" range="0-4001"/>
<Index sourceURL="seg-s1-1024k-4.dat" range="0-3399"/>
<Index sourceURL="seg-s1-1024k-5.dat" range="0-7000"/>
</SegmentInfo>
</Representation>
</Group> </Period> </MPD>
```

METHOD FOR TRANSCEIVING MEDIA FILES AND DEVICE FOR TRANSMITTING/RECEIVING USING SAME

This application is a 35 USC §371 National Stage entry of International Application No. PCT/KR2011/005307 filed on Jul. 19, 2011, and claims priority of U.S. Provisional Application Nos. 61/365,746 filed on Jul. 19, 2010 and 61/453,948 filed on Mar. 17, 2011, all of which are incorporated by reference in their entirety herein.

CROSS-REFERENCE TO RELATED APPLICATIONS

The present application claims priority under 35 U.S.C. 119 and 35 U.S.C. 365 to U.S. provisional Application No. 61/365,746 (filed on Jul. 19, 2010), U.S. provisional Application No. 61/453,948 (filed on Mar. 17, 2011), and PCT Application No. PCT/KR2011/005307 (filed on Jul. 19, 2011) which are hereby incorporated by reference in its entirety.

BACKGROUND

The present disclosure relates to a method and apparatus for transmitting and receiving an MPEG-2 Transport Stream (TS)-based media file.

Nowadays, digital broadcasting such as terrestrial, cable or satellite broadcasting, or Digital Multimedia Broadcasting (DMB) mostly streams AV (Audio/Video) contents using MPEG-2 TS.

In addition, a multimedia service, which provides contents over an Internet Protocol (IP) network as a main transport network, is activated according to a rapid growth of the internet. The digital broadcasting is developing towards the direction of requiring more traffic like stereoscopic 3-dimensional (3D) video broadcasting, Ultra High Definition (UHD) broadcasting, 3D multi-view video broadcasting or hologram broadcasting.

However it may be less efficient to transport content of higher resolution than the prior art HDTV using MPEG-2 TS having a sequence of fixed length packets of 188 bytes over the IP network.

SUMMARY

Embodiments provide a method and apparatus for transmitting and receiving an MPEG-2 TS-based media file for playing the same back in synchronization with another media.

In one embodiment, a method of transmitting an MPEG2 TS-based media file, the method includes: mapping a Presentation Time Stamp (PTS) of a Presentation Unit (PU) to a Media Presentation Time (MPT) for synchronization with other media with respect to at least one program element forming a program included in the media file; and transmitting synchronization information including the mapped media presentation time together with the media file, wherein the media presentation time is provided for a first PU in a segment of the transmitted media file.

In another embodiment, a method of receiving an MPEG2 TS-based media file, the method includes: receiving the media file with synchronization information; extracting an MPT of a PU for at least one program element forming a program included in the media file; and playing back the media file using the extracted media presentation time, wherein the MPT is mapped from a PTS of a first PU in a segment of the received media file.

In further another embodiment, an apparatus for transmitting an MPEG2 TS-based media file, the apparatus includes: a controller mapping a PTS of a first PU among PUs included in each segment or a PTS of a first PU after a PTS discontinuity occurs to an MPT for synchronization with other media for a program element forming a program included in the media file; and a network interface unit transmitting synchronization information including the mapped MPT together with the media file.

In still further another embodiment, an apparatus for receiving an MPEG2 TS-based media file, the apparatus includes: a network interface unit receiving the media file with synchronization information; a decoding unit decoding the received media file; and a synchronization unit synchronizing the decoded media file with other media using an MPT included in the synchronization information, wherein the MPT is mapped from a PTS of a first PU in a segment of the received media file or a PTS of a first PU after a PTS discontinuity occurs.

According to embodiments, since MPEG-2 TS-based media file is transported with synchronization information including media presentation time, it is possible to randomly access to the media file and to easily synchronize the media file to other media installed inside a receiving apparatus or attached externally and play the media file.

In addition, since media presentation time for a time point when discontinuity occurs at a Presentation Time Stamp (PTS) is provided to a receiving apparatus side, the media file can be played back in synchronization with the media presentation time even in a case where the PTS discontinuity occurs.

The details of one or more embodiments are set forth in the accompanying drawings and the description below. Other features will be apparent from the description and drawings, and from the claims.

BRIEF DESCRIPTION OF THE DRAWINGS

FIGS. 9 and 10 are views illustrating configurations of a Segment Index Box (SIB) including synchronization information.

FIGS. 11 and 12 are views illustrating configurations of an eXtensible Markup Language (XML) file including synchronization information.

FIG. 13 is view of illustrating an embodiment of a media file structure transmitted from a transmitting apparatus according to an embodiment.

FIG. 16 is a view illustrating an embodiment of a segment list created by using a Media Presentation Description (MPD).

FIGS. 18 and 19 are views illustrating embodiments of a method of implementing a media file using an MPD of MPEG Dynamic Adaptive Streaming over HTTP (DASH).

DETAILED DESCRIPTION OF THE EMBODIMENTS

Reference will now be made in detail to the embodiments of the present disclosure, examples of which are illustrated in the accompanying drawings.

A method of and apparatus for transmitting and receiving MPEG-2 Transport Stream (TS)-based media file according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Figure 1:
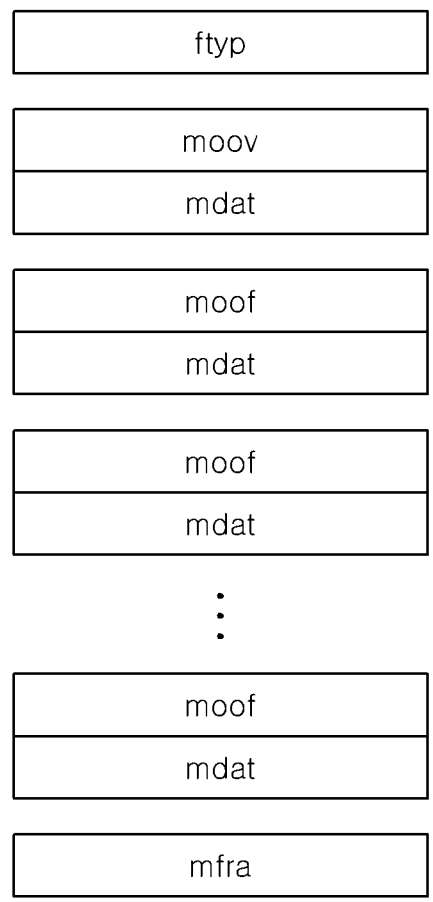
FIG. 1 is a view illustrating a configuration of an ISO Base Media file format.

FIG. 1 illustrates a configuration of an ISO Base Media file format. In order to stream the illustrated ISO Base Media file format, a "fragmented file" format may be adopted.

Referring to FIG. 1, the fragmented file may be formed by dividing media tracks into plural fragments, each of which includes a movie fragment (moof) box and a media data (mdat) box.

The mdat box after the moof box includes fragment media data and this combined moof-mdat pair may form a single fragment.

In the fragmented ISO Base Media file format, general timing fields may be provided a Sample Table (ST) box such as a decoding time-to-sample (stts) box or a composition time-to-sample (ctts) box. However since the above described timing fields exist in moov (Movie) box, they are rarely used in transporting timing information.

Meanwhile since the moov box is finely encoded, it is assumed all the previous samples are valid to a client side, for example a receiving apparatus, in order to access to a desired sample. The above described assumption is not proper to a streaming application.

A Movie Fragment Random Access (mfra) file positioned at the end of a media file may be used to provide a reference to fragments including random access points.

However the mfra box uses an absolute byte offset from the beginning of a file referring to the fragments and is not fragmented. Therefore it can provide timing information of a fragmented media file in a stored state like a recording process but is not possibly used in streaming application.

Accordingly, the ISO Base Media file format as shown in FIG. 1 does not provide timing information for streaming the fragmented tracks.

On the other hand, a segment is a unit that a media file is transmitted and received and a configuration thereof may be variously defined.

For example, in "3GPP Adaptive HTTP Streaming (AHS)", "OIPF HTTP Adaptive Streaming (HAS)", and "HTTP Streaming of MPEG media", the segment includes one or more movie fragments and each segment has approximately identical duration in one period. In "3GPP AHS", the entire structure of the segment is defined and it is allowed to use the segment as a fine download unit or to download a portion of the segment using a byte range.

A 3GPP file format may include a Segment Index (sidx) box which provides a track play start time for the tracks in the fragment in order to provide timing information on lost tracks and the play times may be recovered from decoding times.

A "3GPP AHS" client may fetch a segment using an approximately created timeline and reconstruct a timing of each track using the sidx box. Once the entire segment or a portion of the segment is downloaded, the timing information may be included in the file in order to be used for playing afterward.

In "Microsoft Smooth Streaming (MS SS)", the segment may be defined as one fragment, and the one fragment may include one track. The fragment is a basic unit for downloading and the term 'segment' is not used.

The "MS SS" may provide a FragmentTime attribute for each fragment within a ManifestResponse file and the information may be provided in a StreamFragmentElement field.

In the foregoing "MS SS", since only one track exists in the track fragment, a timing of the track fragment can be sufficiently represented by a single FragmentTime. The timing information may be requested for each track in order to enable a start of a synchronized presentation after a random access and a switch between replaceable presentations.

Storing of the "MS SS" media file is performed in a file in which the timing information is stored, which is performed by storing the media file in the MS PIFF or including the timing information in a mfra box.

Figure 2:
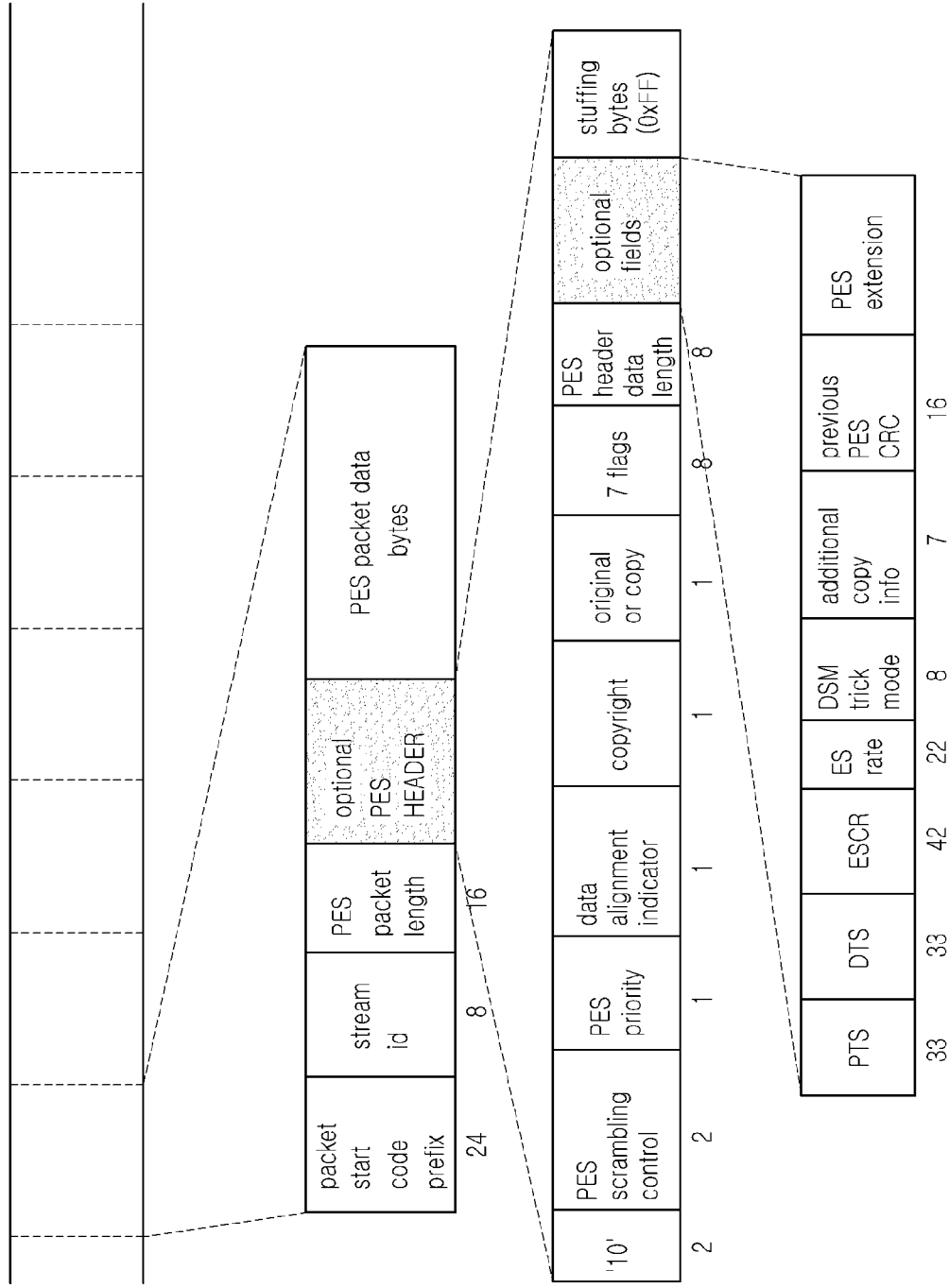
FIG. 2 is a view illustrating a structure of a MPEG2 Packetized Elementary Stream (PES) packet.
Figure 3:
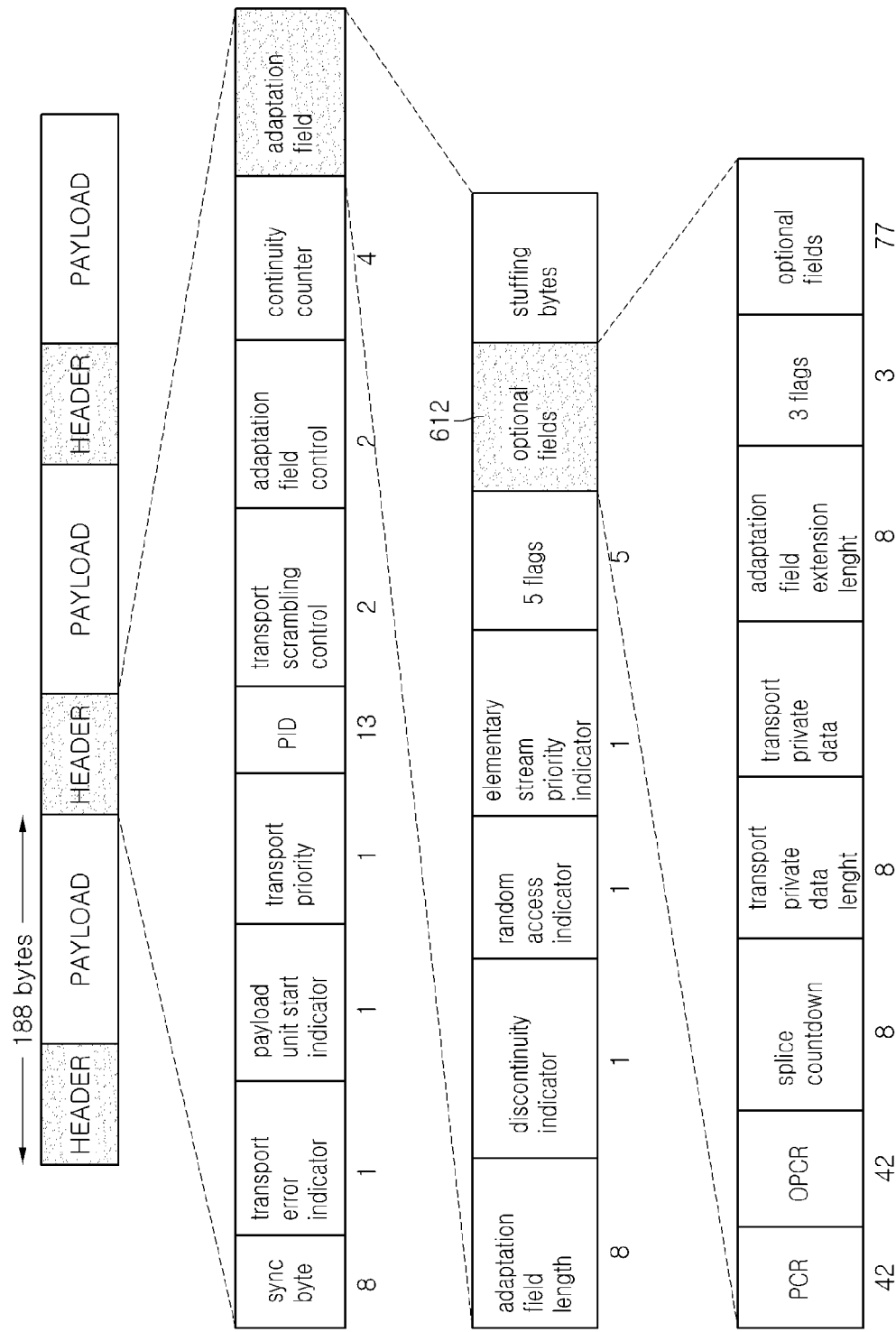
FIG. 3 is a view illustrating a structure of MPEG TS.

FIG. 2 illustrates an MPEG2 PES packet structure and FIG. 3 illustrates a MPEG2 TS structure.

Referring to FIG. 2, an MPEG2 video stream compressed by an MPEG encoder may be packetized into a PES packet having a predetermined size.

The PES packet includes a PES header and a PES packet data field and the PES header may include an optional PES HEADER. In addition, the optional PES HEADER includes an optional field 510 and the optional field 510 includes a PTS field and a DTS field.

The PTS field may include Presentation Time Stamp (PTS) information and the DTS field may have Decoding Time Stamp (DTS) information.

Synchronization between a video stream and an audio stream may be achieved with Time Stamp, which is time information representing when to present each decoding unit called an access unit of the video and audio streams.

For example, a PTS in the audio stream and a PTS and a DTS in video stream may be provided as the time information. The video and audio streams may be synchronized with each other by comparing the foregoing time stamp and a System Time Clock (STC) which is a time reference of a decoder and determining whether to present them.

Referring to FIG. 3, a transport packet of MPEG2 TS includes 4 byte header and a following 184 byte payload and has total 188 byte size regardless of an intended transport mechanism.

The payload may include a PES packet, a Program Association Table (PAT), a Program Map Table (PMT) or the like, and the header may include a plurality of fields such as a sync byte and an adaptation field.

The adaptation field may include an optional field and the optional field may include a Program Clock Reference (PCR) field to which PCR information of time reference information is written.

The PCR is inserted to a header of MPEG2 TS for synchronization between an encoder and a decoder as a reference clock for PTS and STS.

The PTS is used for synchronized-presentation of element streams included in one program, but does not have any relationship of synchronization with an external clock such as the Universal Time Coordinated (UTC).

In addition, continuity of the PTS is not secured, so discontinuity or reset may occur in the PTS.

For example, in an application field of MPEG2 TS such as digital video broadcasting, the foregoing discontinuity of the PTS may be delivered by the PCR and a discontinuity indicator as shown in FIG. 3 immediately before the corresponding event occurs.

The PTS may be used for synchronized presentation of one program, but is not sufficient to be used in presentation in synchronization with a general presentation timeline, for example, a media presentation timeline used in a HTTP streaming service.

In order to use the PTS in synchronization with the general presentation timeline, initial synchronization, synchronization after a random access and synchronization after the PTS discontinuity are needed to be considered.

Figure 4:
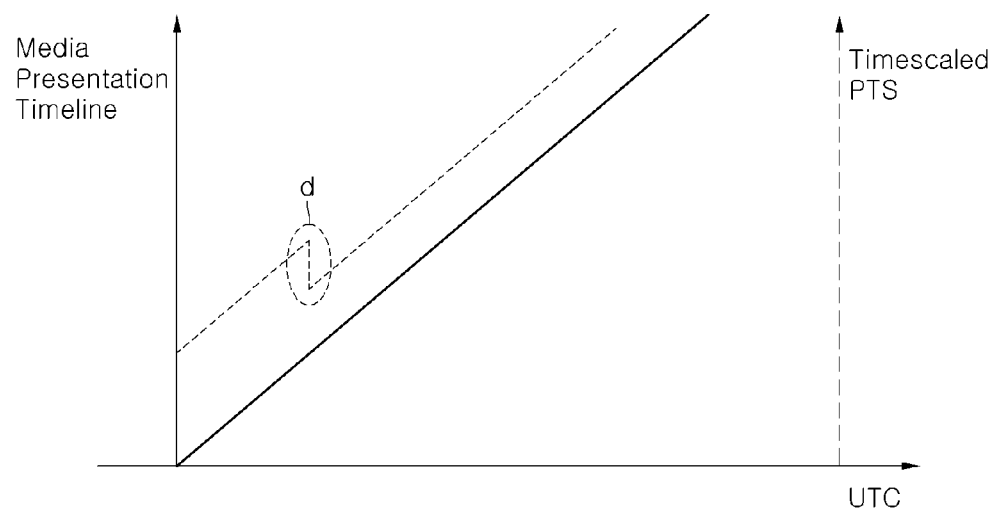
FIG. 4 is a graph illustrating a Presentation Time Stamp (PTS) of MPEG2 Transport Stream (TS) vs. a Media Presentation Time (MPT).

FIG. 4 illustrates a graph of relationship between PTS of MPEG2 TS and Media Presentation Time (MPT).

In FIG. 4, a solid line indicates a media presentation timeline with which the presentations in all the media are synchronized, and a dashed line indicates a PTS timeline representing a local presentation time within a program.

The MPT indicates times within the corresponding file as defined in the ISO Base Media file format and starts from '0'.

The PTS may be represented as a time-scaled PTS timeline that a value measured in 90 KHz clock is represented as a 33 bit size.

Referring to FIG. 4, the media presentation timeline may start from presentation start offset provided in a manifest file such as Media Presentation Description (MPD).

The PTS timeline may start from any point and have discontinuity d in some cases.

Other than ISO Base Media, MPEG TS allows direct fragmentation within a range where the fragment has a 188 byte size. MPEG2 TS-based "Apple HTTP Streaming" or "OIPF HAS" uses the same scheme as the one that the MPEG2 TS is segmented into segments in a predetermined period.

In this case, the segment period is not generally precise for each media component. The media component of a program included in the MPEG2 TS divides the MPEG2 TS into segments in a rough period using a PCR or a PTS as a reference, so the segment periods may vary among tracks.

"Apple HTTP Streaming" and "OIPF HAS" do not designate or refer to additional ways representing timing information for MPEG2 TS, downloads MPEG TS using a rough timeline and sets a start time of the segment to the rough timeline.

Since "MS SS" is not related to delivery of MEG2 TS media files, it may be difficult to directly apply "MS SS" to the transporting of the MPEG2 TS. In addition, "MS SS" allows only one track for each fragment, so "MS SS" is not suitable to a transport stream having a plurality of multiplexed programs.

After downloading a portion of or the entire file, the corresponding file is required to be stored as an MPEG TS file and the timing information is require to be valid for future playback. Accordingly perfect synchronization with the media presentation timeline in the MPEG2 TS file transport using "MS SS" may be hard to achieve.

Figure 5:
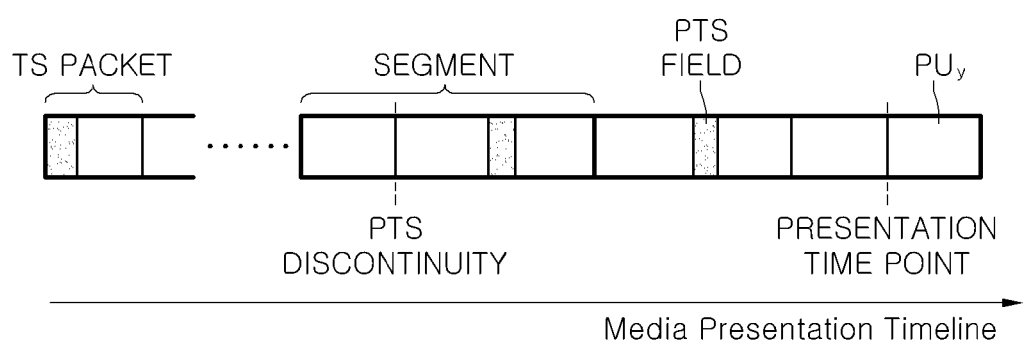
FIG. 5 is a view illustrating an embodiment of a method of presenting any Presentation Unit (PU) included in MPEG2 TS.

FIG. 5 illustrates an embodiment of a method of presenting any presentation unit (PU) included in MPEG2 TS.

Referring to FIG. 5, MPEG2 TS packets respectively have a fixed 188 byte size and may be transported in a segment unit including one or more packets, for example, 3 MPEG2 TS packets.

Meanwhile, a client side, for example, a receiving apparatus may try to receive any segment, synchronize any presentation unit $PU_y$ with the media presentation line and present $PU_y$.

At this time, a PTS discontinuity may occur in a previous segment of a segment including the presentation unit $PU_y$ to be presented and thus the corresponding segment may not be received to be valid due to the PTS discontinuity in a random access case.

That is, in a MPEG2 TS-based media file, precise media presentation time information for a PU is not provided for a random access or a continuous access in a segment. This may cause more limitation in the PTS discontinuity case.

When the MPEG2 TS is not synchronized with the media presentation time, internally stored or streamed MPECG2 TS-based media file and other media, for example, ISO Bas Media file format media or another MPEG TS-based media are not synchronized with each other and the media file may not be played back.

According to an embodiment, MPEG2 TS media file may be synchronized with other media by signaling to map a timeline of MPEG2 TS-based media file to the media presentation time.

For example, a transmitting apparatus according to an embodiment may map a PTS of a PU for at least one program element forming a program included in the media file to the media presentation time and synchronization information (abbreviated as sync information) including the mapped media presentation time may be transported with the mapped media presentation time.

Figure 6:
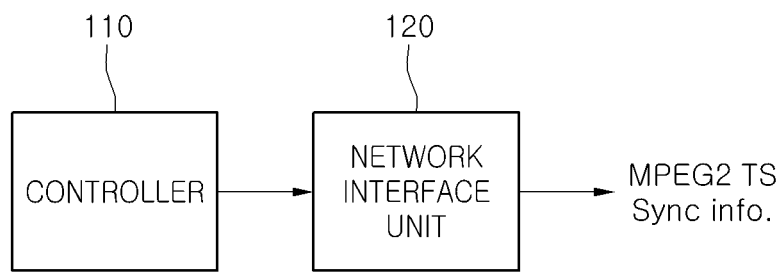
FIG. 6 is a block diagram illustrating a schematic configuration of an apparatus for transmitting a media file according to an embodiment.

FIG. 6 illustrates a block diagram of a schematic configuration of a media file transmitting apparatus according to an embodiment. The illustrated transmitting apparatus may include a controller 110 and a network interface unit 120.

Referring to FIG. 6, the controller 110 may generate sync information to be provided to a client side, for example, a receiving apparatus, by mapping a PTS of a PU for a program element forming a program included in an MPEG2 TS-based media file to a media presentation time.

The network interface unit 120 may transmits sync information including the mapped media presentation time to the receiving apparatus with the MPEG2 TS-based media file.

According to an embodiment, the sync information transmitted to the client side may be provided to a first PU of each segment included in any one program element.

In this case, the sync information may be used to recover a presentation time for all the PUs from the first PU of a specific segment to a next PTS discontinuity occurring point included in MPEG2 TS.

In addition, the sync information may be provided for a first PU after the PTS discontinuity occur in the segment, and the sync information may be used to recover the presentation time for all the PUs from the PTS discontinuity occurring point to a next PTS discontinuity occurring point of a next PTS discontinuity included in an MPEG2 TS.

Meanwhile, the PTS discontinuity does not occur any more, the sync information occurring point may be used to recover a presentation time for all the PUs from the PTS discontinuity occurring point to an end of the corresponding segment included in the MPEG2 TS.

The MPEG2 TS-based playback may include a plurality of program elements belonging to one program and the sync information for any one of the program elements may be transported to the client side.

That is, when any one program element is synchronized with the media presentation time, the rest of the program elements may be synchronized with one program using a synchronization mechanism provided by the MPEG2 TS.

Hereinafter a method of transmitting a media file according to embodiments will be described with reference to FIGS. 7 to 13.

Figure 7:
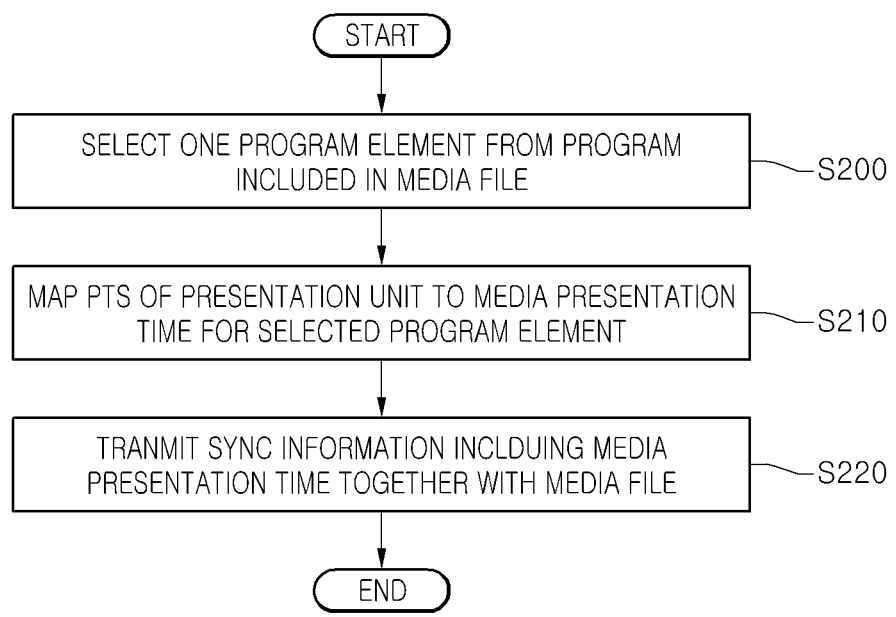
FIG. 7 is a flowchart illustrating a method of transmitting a media file according to an embodiment.

FIG. 7 is a flowchart illustrating a method of transmitting a media file according to an embodiment. The illustrated method of transmitting a media file will be described in connection with the apparatus for transmitting a media file according to the embodiment illustrated in FIG. 6.

Referring to FIG. 7, the controller 100 of the transmitting apparatus 100 selects one of program elements included in a media file to be transmitted (operation S200).

For example, the controller 100 may select video tracks among video tracks and audio tracks forming the program as a reference program element.

Then the controller 110 maps a PTS of a PU for the selected program element to a media presentation time (operation S210).

Figure 8:
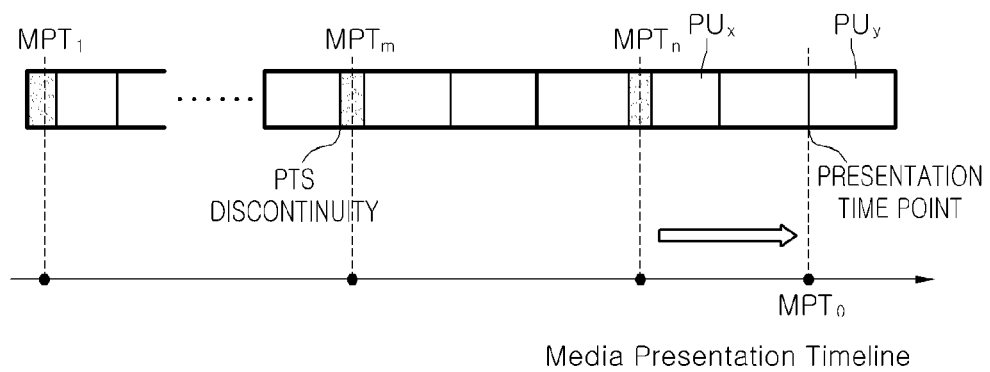
FIG. 8 is a view illustrating an embodiment of a method of presenting any PU included in MPEG2 TS in synchronization with a media play timeline.

Referring to FIG. 8, media presentation times, for example, $MPT_1$ to $MPT_n$ for a first PU of a segment among PUs belonging to a specific program element may be transported to the client side as sync information.

Meanwhile, when a specific presentation unit $PU_y$ is to be presented, a media presentation time MPT0 for PUy may be calculated by mapping a PTS of the PU as the following equation 1

$$MPT_o = ((PTS_1 - PTS_k)/timescale_{PTS})*timescale + MPT_n \quad (1)$$

In equation 1, $PTS_1$ denotes a PTS of $PU_y$, $PTS_k$ denotes a PTS of a presentation unit $PU_x$ positioned before the $PU_y$, and $MPT_n$ denotes a media presentation time for the $PU_x$.

$timescale_{PTS}$ denotes a clock of the PTS, for example 90 kHz, and timescale denotes a clock of the MPT.

For example, the controller 110 of the transmitting apparatus 100 recovers $PTS_s$, namely, $PTS_1$ and $PTS_k$ for $PU_y$ and $PU_x$ respectively, and calculates a next media presentation time $MPT_0$ by linear interpolation like equation 1 using the recovered $PTS_1$ and $PTS_k$.

As shown in FIG. 8, after the occurrence of the PTS discontinuity in the segment, a media presentation time, for example, $MPT_m$ for the first PU may transported to the client side as sync information.

Accordingly, even in a case where the discontinuity occurs in a specific segment, the media presentation time for the specific presentation unit may be calculated by the foregoing linear interpolation with reference to the equation 1.

As the above, a method of mapping the PTS of the presentation unit to a media presentation time is described for an exemplary case where $PU_x$ and $PU_y$ are included in one program element with reference to FIG. 8. However in a case where the $PU_x$ and $PU_y$ may be respectively included to different program elements, a media presentation time for a specific presentation unit may be calculated using the foregoing method.

The network interface unit 120 transports sync information including the calculated media presentation times to the client side with the media file (operation S220).

According to the foregoing mapping scheme, a specific presentation unit may be searched for on the basis of the PTS for a given media presentation time, which may be used in random access or stream switching.

For example, PTS1 which is a PTS value for any media presentation time MPT0 may be calculated as the following equation 2.

$$PTS_1 = ((MPT_o - MPT_n)/timescale)*timescale_{PTS} + PTS_k \quad (2)$$

When the media presentation time is represented by a second unit, not by a clock, the equation 2 may be simplified as the following equation 3

$$PTS_1 = (MPT_o - MPT_n)*timescale_{PTS} + PTS_k \quad (3)$$

According to an embodiment of the present invention, the transmitting apparatus 100 transmits media presentation times ($MP_1$, $MP_m$ and $MPT_n$) for the first PU or a first PU after the occurrence of the PTS discontinuity among the PUs included in the segment as shown in FIG. 8, or obtains a media presentation time $MPT_0$ for another PU according to the foregoing mapping method and transports the obtained MPT to the client side as the sync information.

Hereinafter a configuration of sync information transported to the client side will be described in detail with reference to FIGS. 9 to 12.

The sync information may be structuralized as the following way.

At first, any one of a plurality of the program elements included in a program of an MPEG2 TS media file is selected as a reference program element and a media presentation time for a first PU of the selected reference program is provided to the client side.

In order to handle the PTS discontinuity included in a segment, a duration from the first PU of the selected reference program to a time point of a next PTS discontinuity occurrence (or to an end of the corresponding segment when the PTS discontinuity does not occur) is provided to the client.

When the PTS discontinuity occurs twice or more, the duration from any one PTS discontinuity to a next PTS discontinuity (or to an end of the corresponding segment when the PTS discontinuity does not occur) is provided to the client side.

In addition, a PTS of a PU of the reference program element immediately after the PTS discontinuity occurrence may be also provided to the client side.

A media presentation time for all the PUs included in the segment may be recovered by using the sync information created as the forgoing.

However, in addition to signaled information for synchronized presentation as the foregoing, a duration before and after the PTS discontinuity may be more divided into smaller durations and this additional signaling may be used by the client side for a random access or the like.

As described above, although a signaling of a presentation time for any one program element in a program may be necessary and sufficient to synchronize any program element with a media presentation timeline, syntax of the sync information may enable signaling of presentation times for a plurality of program elements.

This may be advantageous for the client to try to selectively present program elements.

For example, when an MPEG2 TS program includes two audio tracks L1 and L2 of different languages, the client may want to playback only L1 track between the audio tracks.

At this time, if signaling for the media presentation time is provided only to L2, the client needs to extract PTS information from L1 to recover presentation times. However signaling for media presentation time is provided to both L1 and L2, the client does not need to extract separate PTS information to recover the presentation times.

In order to segment a transmitted MPEG2 TS media file, the media file is roughly segmented according to a reference track period as required from a transport protocol and boundaries of the segments may be adjusted to MPEG2 TS packets.

According to an embodiment, the foregoing sync information may be represented as a binary coded format file or an XML file.

FIGS. 9 and 10 illustrate embodiments of a configuration of a segment index box including sync information, which is an example representing the sync information in a binary format.

According to an embodiment, the sync information as described in relation to FIGS. 6 to 8 may be represented in a binary format on the basis of general ISO Base Media file format data types and has a similar structure to a sidx box used in 3GPP AHS.

Referring to FIG. 9, the sync information may be formed of an MPEG2 segment index box m2si, and the m2si box may be included one or more in a specific segment.

The m2si box may provide media presentation time for PUs included in MPEG2 TS with respect to one or more program elements of MPEG2 TS.

The segment may be subdivided into a plurality of MPEG2 TS packet groups (MTPGs) and the MTPGs may be formed of a set of adjacent MPEG2 TS packets.

When one program element, for example, a video program element is selected as a reference program element, at least a first sample, namely, a presentation time for a PU of the reference program element may be provided in a first loop.

A second loop may be performed on each MTPG included in a segment starting from the first MTPG. In the second loop, a presentation duration of a reference program element of each MTPG may be provided with byte offsets from a first byte of an MPEG2 TS to a corresponding MTPG in the segment.

The presentation duration of the MTPG may be a sum of presentation durations of all the PUs of the reference program elements belong to the MTPG.

In the second loop, information on whether a random access point (RAP) is included in a reference program element of an MTPG may be provided. When the RAP is included, a presentation time offset from a presentation time for a first sample in the corresponding segment may be more provided.

Other than sidx box of 3GPP AHS, the m2si box may be positioned at a start portion of the segment and does not allow a hierarchical structure, so that the m2si box may be easily removed.

Referring to a syntax structure as shown in FIG. 10, flags may form a 24-bit integer flag and defined as follows.

timescale-present represents whether time scale of a media presentation time exists in the corresponding box and a flag value thereof may be '0x000001'.

pts-present represents whether a PTS of a first PU of a reference track is included for all the written MTPGs and a flag value thereof may be '0x000002'.

timescale is a time scale of media presentation timeline. When the timescale is provided one or more in one media presentation, a value thereof may be identical for all the presentations.

reference-PID provides packet identifiers (PIDs) of MPEG2 TS packets transporting a reference program element.

program_element_count represents the number of program elements indexed in a next loop and may be designated 1 or a greater value.

referenc_count represents the number of program elements indexed in a second loop and may have 1 or a greater value.

PID represents PIDs of MPEG2 TS packets transporting program elements therein to which representation_time is provided and a PID in the corresponding loop is identical to the reference_PID.

presentation_time may represent a presentation time for a first sample in a program element identified by the PID expressed in the timescale.

Reference_offset may represent a byte distance from a first byte of an MPEG2 TS segment to a first byte of an MPTG referred by repeating of the corresponding loop.

MTPG_duration provides a presentation period of a reference program element for the referred MPTG and may be represented in a time scale of a corresponding track.

PTS may represent an MPEG2 TS PTS of a first PU of a reference program element of the corresponding MPTG.

contains_RAP may be set to '1' in order to represent that the reference program element in the referred MPTG includes a RAP.

discontinuity may be set to '1' in order to represent that the corresponding MPTG starts from discontinuity.

RAP_delta_time may provide a presentation time offset of a RAP in order to correspond to a presentation time for a first sample of the reference program element in the segment, when contains_RAP is set to '1'. When contains_RAP is set to '0', the RAP_delta_time may be maintained as '0'.

FIGS. 11 and 12 illustrate embodiments of a configuration of an XML file including sync information.

Referring to FIG. 11, an XML file may include a media presentation time for PUs of one or more program elements of an MPEG2 TS and the segment may be subdivided into adjacent MTPGs.

When one program element, for example, a video program element is selected as a reference program element, a presentation time for at least a first sample, namely, a presentation unit of the reference program element is provided in a first element.

In addition, a second element is for each MTPG included in a segment starting from a first MTPG. The second element may provide presentation periods of a reference program element for each MTPG of the segment.

The presentation period of the MTPG may be a sum of presentation periods of all the PUs of a reference program element belonging to the corresponding group.

The second element may be provided information on whether the reference program element of the MTPG includes a RAP. When the RAP is included, a presentation time offset may be further provided to a presentation time for a first sample in the corresponding segment.

FIG. 11 illustrates a schema of sync information having a configuration as shown in FIG. 10 and the detailed description for the illustrated schema is the same as described above in relation to FIGS. 9 and 10. Therefore description thereof will be omitted.

Figure 13:
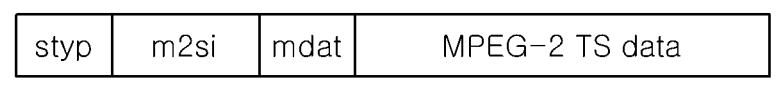

FIG. 13 illustrates an embodiment of a file structure of a media file transmitted from a transmitting apparatus according to an embodiment.

Referring to FIG. 13, an m2si box described in relation to FIGS. 9 and 10 may be attached before an MPEG2 TS divided into a segment unit. The MPEG2 TS data may be selectively encapsulated in a mdat box to make an access and demarcation easy.

As illustrated in FIG. 13, when the sync information is appended in a binary format, the m2si box may be attached before the mdat box.

The media file format may start from a segment type (styp) box, the styp box may have a boxtype set as 'styp', a brand of 'etsf' and a minor_version set to '1'. Except this, the styp box may have the same syntax structure as a file type box (ftyp) defined in the ISO/IEC 14496-12 ISO Base Media file format.

Hereinafter embodiments of a media file receiving method and apparatus will be described with reference to FIGS. 14 and 15.

A receiving apparatus 300 according to an embodiment may receive a media file with sync information, extract a media presentation time of a PU from the received sync information and then playback the media file using the extracted media presentation time.

A configuration of the sync information received by the receiving apparatus 300 may be the same as described above in relation to FIGS. 6 to 13. Therefore detailed description thereof will be omitted.

Figure 14:
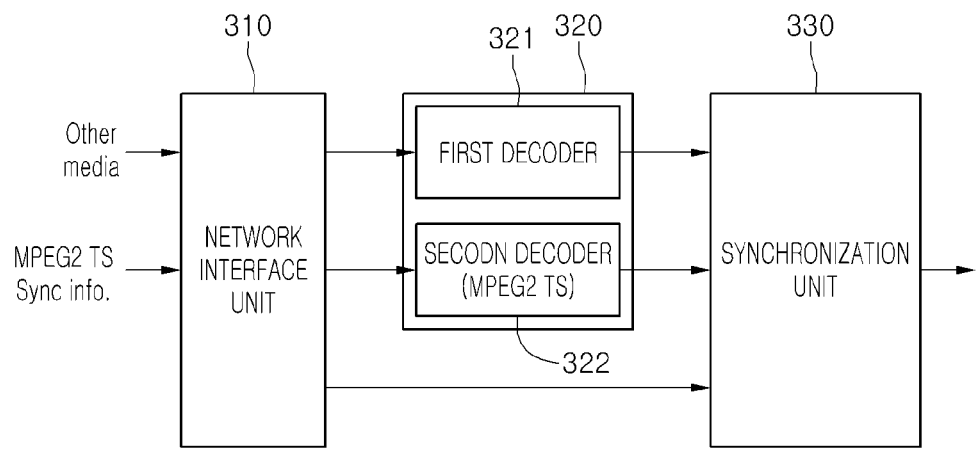
FIG. 14 is a block diagram illustrating a configuration of an apparatus for receiving a media file according to an embodiment.

FIG. 14 illustrates a block diagram of a configuration of a media file receiving apparatus according to an embodiment. The illustrated receiving apparatus 300 may include a network interface unit 310, a decoding unit 320 and a synchronization unit 330.

Referring to FIG. 14, the network interface unit 310 of the receiving apparatus 300, for example, a HTTP interface, receives a media file with the sync information and the decoding unit 320 may decode the received media file and output the decoded media file.

The synchronization unit 330 may synchronize the decoded media file with a media presentation timeline using a media presentation time included in the sync information.

For example, the network interface unit 310 may receive sync information having the configuration as described above in relation to FIGS. 6 to 13 with an MPEG2 TS from the transmitting unit 100.

The decoding unit 320 may include a second decoder 322 for decoding the MPEG2 TS and the second decoder 322 may be a general MPEG2 TS decoder.

The second decoder 322 may receive to decode the MPEG2 TS from the network interface unit 310 and output the decoded PUs and PTSs thereof.

The synchronization unit 330 may identify a presentation unit to which a media presentation time is provided through the received sync information. For this, the network interface unit 310 recovers the PTSs of the PUs of which presentation times are provided and transfers the recovered PTSs to the synchronization unit 330 or receives the presentation time and PTSs of the corresponding unit from the transmitting apparatus 100.

For recovering the PTSs, elementary stream time recovery may be used.

The decoding unit 320 may further include a first decoder 321 to decode another media file received through the network interface unit 310 and the first decoder 321 may be a decoder for recovering another format media file such as in a 3GPP file format or an MPEG2 TS decoder which is the same as the second decoder 322.

The synchronization unit 330 may synchronize an MPEG2 TS-based media file output from the second decoder 322 with another media file output from the first decoder 321 using decoding information transmitted from the transmitting apparatus 100, for example, media presentation times for the PUs.

The receiving apparatus 300 may playback the MPEG2 TS-based media file synchronized by the synchronization unit 330 and another media file together.

According to another embodiment, the decoded MPEG2 TS may be stored in a memory (not shown) prepared in the receiving apparatus 300. The sync information included in the received m2si box or xml file may be also stored in the receiving apparatus 300.

The stored sync information may be used later for synchronized presentation with other media components.

In addition, the byte offsets for the PTS discontinuities may be stored as attributes in the m2si box or the xml file including the sync information.

In this case, since all the segments of MPEG2 TS are combined, the byte offsets provided in the synchronization box or file should correspond to a start of the MPEG2 TS file.

FIG. 16 illustrates an embodiment of a segment list created by using an MPD.

The client performing HTTP streaming may access to the MPD and create the segment list as shown in FIG. 16 from the MPD at a specific client-local time "NOW".

"NOW" may represent a current value of a clock in the reference client when an MPD instance is formed from the MPD.

The client that is not synchronized with a HTTP streaming server but synchronized with the UTC may experience problems of accessing to segments due to validity. HTTP streaming clients should synchronize their own clocks with a precise universal time.

Figure 17:
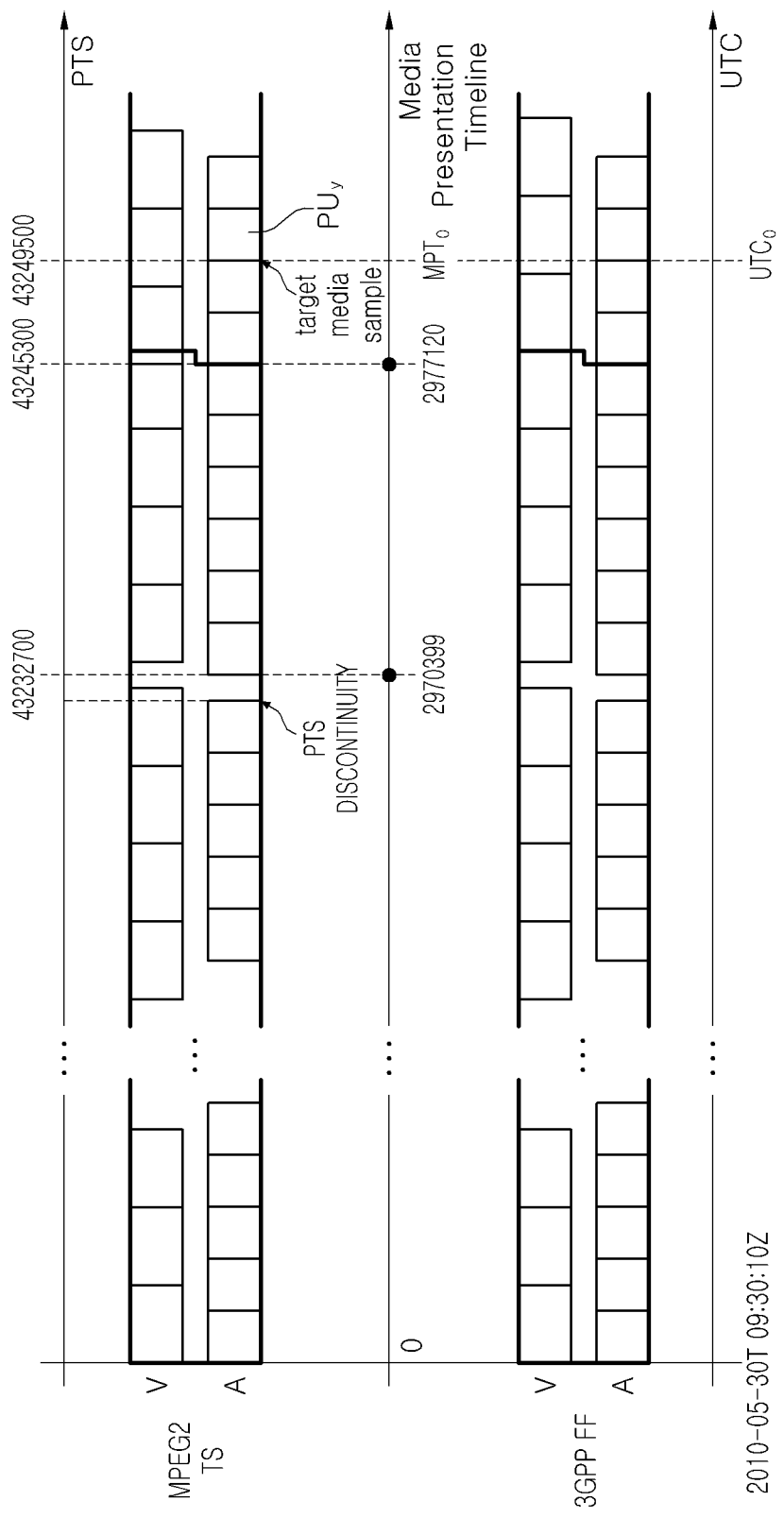
FIG. 17 is a view illustrating an embodiment of a method of playing an MPEG2 TS-based media file in synchronization with a 3GPP media file.

FIG. 17 illustrates an embodiment of a method of synchronizing an MPEG2 TS-based media file with a 3GPP media file and playing back.

Referring to FIG. 17, a specific PU $PU_y$ included in an MPEG2 TS media file may be synchronized with a sample corresponding to the 3GPP media file and played back using the sync information as described above in relation to FIGS. 6 to 12.

In the embodiment as shown in FIG. 17, the m2si box including MPD information, 3GPP file format information for segment and sync information may be given as follows.

—MPD Information:
availabilityStartTime=2010-05-30T 09:30:10Z
SegmentInfo duration=PT2S (Segment boundary shown is for segment # 32)
—3GPP FF Information for segment:
time_scale=48000
track_ID 1=(Video)
decode_time=2974186
composition_offset=1602
track_ID 2=(Audio)
decode_time=2976000
—m2si (corresponding)
PID=101
presentation_time=2977120

In this case, the UTC used for rendering $PU_y$ which is a PU played back according to the mapping method as described above in relation to FIGS. 5 to 8 may be calculated as the following equation 4.

$$PU_y = (((PTS_1 - PTS_k)/\text{time\_scale\_ext}) + \text{presentation\_time}/\text{time\_scale}) + \text{availabilityStartTime} \quad (4)$$

In equation 4, the UTC "2010-05-30T 09:31:02.07Z" used for rendering $PU_y$ may be obtained by substituting $PTS_1$ with PTS "43249500" of $PU_y$, $PTS_k$ with PTS "43245300" of a PU to which media presentation time "29977120" is provided, time_scale_ext with clock "90000" of PTS, time_scale with "48000" given in 3GPP file format information, and availabilityStartTime with "2010-05-30T 09:30:10Z" given in the MDP information.

FIGS. 18 and 19 illustrate embodiments of a method of implementing a media file using a MPD of MPEG Dynamic Adaptive Streaming over HTTP (DASH).

As shown in FIG. 18, an index segment which is sync information as described above in relation to FIGS. 6 to 17 may exist separately in MPEG-DASH.

The media file may be implemented with syntax having the same media file structure as the described above in relation to FIG. 13 and the index data may be stored after the MPEG2 TS media file. Therefore the number of stored files may be greatly reduced.

In addition, the client may confirm how many bytes correspond to the index data and how many tailings correspond to the media data in the media file.

In this case, the client may recognize that a Universal Resource Locator (URL) for a media segment coincides with a URL of the index segment corresponding to the media segment. Accordingly the client may divide the segments in combination with a request.

A general client may not use this optimization and may obtain the same effect through two ttp requests.

Another client which is not able to use the index data may neglect the same and just fetch the media data.

A method of receiving and processing the MPEG2 TS-based media file as described in relation to FIGS. 1 to 19 may be performed by an IPTV receiver according to an embodiment.

For this, the IPTV receiver may receive a media file transmitted from a transmitting side, for example, a media server, and a format of the media file may have a configuration as described in relation to FIGS. 6 to 19.

The IPTV receiver may synchronize an MPEG2 TS with other media and play back using sync information received from the transmitting side.

Figure 15:
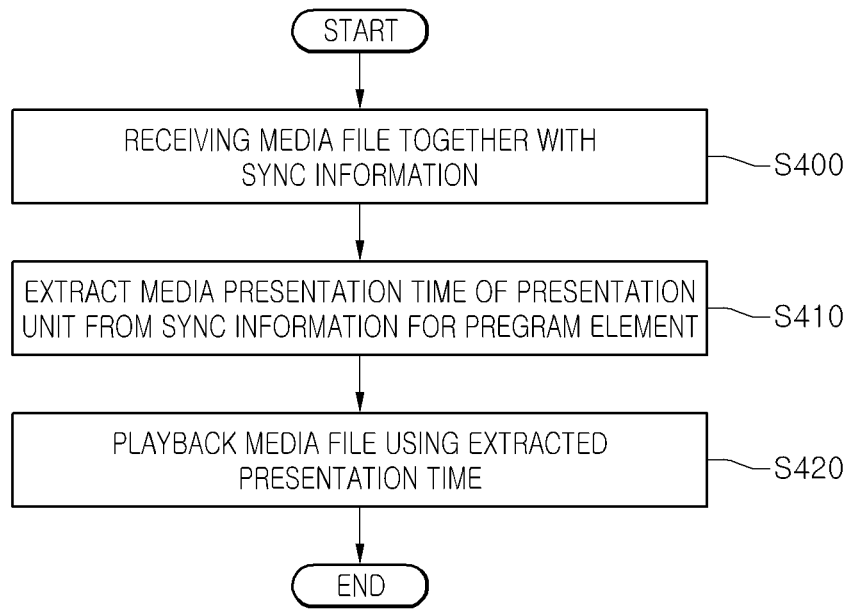
FIG. 15 is a flow chart illustrating a method of receiving a media file according to an embodiment.

The IPTV receiver may perform a method of receiving a media file as described in relation to FIGS. 14 and 15.

Hereinafter, a configuration of the IPTV receiver according to an embodiment will be described in detail with reference to FIGS. 20 and 21.

Figure 20:
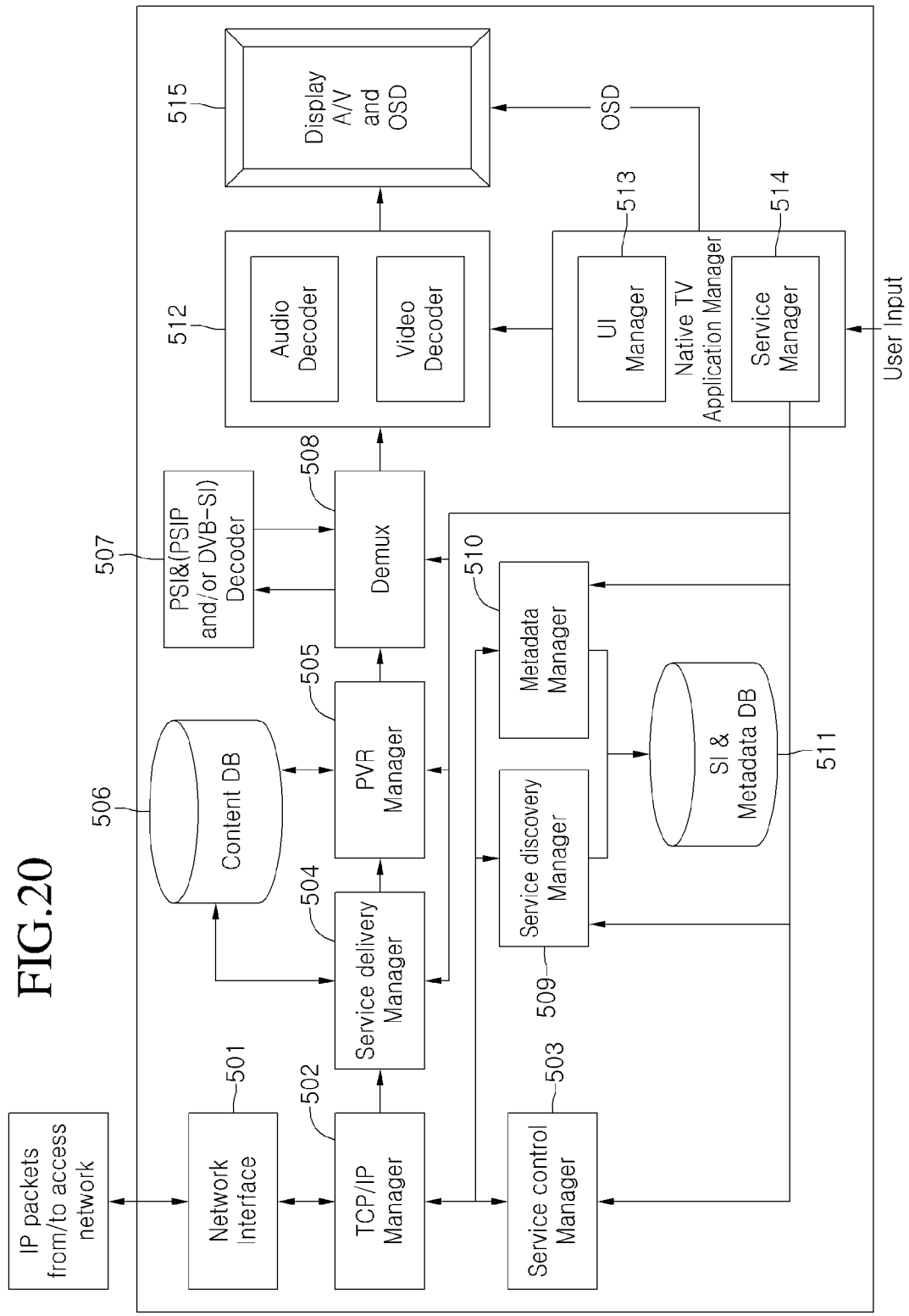
FIG. 20 is a block diagram illustrating a configuration of an IPTV receiver according to a first embodiment of the present invention.

FIG. 20 illustrates a block diagram of an IPTV receiver configuration according to an embodiment.

An IPTV receiver according to an embodiment may include a separate tuner for receiving terrestrial broadcasting, cable broadcasting or satellite broadcasting. However, in this disclosure, the IPTV receiver having a configuration of receiving an IPTV service provided over an IP network will be mainly described for convenience.

An ITF indicates Open IPTV Terminal Function and may suggest a receiver formed of function modules necessary for supporting the IPTV service.

The IPTV receiver may include a network interface unit 502, a TCP/IP manager 502, a service delivery manager 504, a PVR manager 505, a demultiplexer (Demux) 508, a data decoder 507, an audio/video decoder 512, an display and OSD unit 515, an application manager 513 and 514, a service information (SI) and Metadata database (DB) 511, a service discovery manager 509, a service control manager 503, a metadata manager 510 and a content DB 506.

Referring to FIG. 20, the network interface unit 501 receives and transmits packets from and to a network. Namely, the network interface unit 501 receives a service or media contents from a service provider over the network.

The TCP/IP manager 502 manages packet delivery from a source to a destination with respect to packets received by the IPTV receiver and packets transmitted from the IPTV receiver. In addition, the TCP/IP manager 502 classifies the received packets so as to correspond to a proper protocol, and outputs the classified packets to the service discovery manager 509, the service control manager 503 and the metadata manager 510.

The service delivery manager 504 controls the received service data. For example, in a case of controlling real-time streaming, the service delivery manager 504 may use a RTP/RTCP.

When the real-time streaming data is transported using the RTP, the service delivery manager 504 parses the received data packet according to the RTP and transports the parsed data packet to the Demux 508 or stores the same to the content DB 506 according to a control of the service manager 514. In addition, the service delivery manager 504 feeds the network reception information back to a server side providing the service using the RTCP.

The Demux 508 demultiplexes the received packets into audio, video and Program Specific Information data and transports the demultiplexed data respectively to the audio/video decoder 512 and the data decoder 507.

The data decoder 507 decodes, for example, service information such as PSI. Namely, the data decoder 507 receives a PSI section, a program and Service Information Protocol (PSIP) section or a DVB-SI section demultiplexed by the Demux 508 and decodes the received sections.

The data decoder 507 decodes the received sections to make a database for service information and the database for service information is stored in the SI & Metadata DB 511.

The audio/video decoder 512 decodes video data and audio data received from the Demux 508. The video data and audio data decoded in the audio/video decoder 512 are provided to a user through the display and OSD unit 515.

The application manager 513 and 514 manages the entire state of the IPTV receiver, provides a user interface and manages other managers. For this, the application manager includes a user interface manager 513 and a service manager 514.

The user interface manager 513 provides a Graphic User Interface (GUI) for a user using an On Screen Display (OSD), and performs receiver operations according to a key input from the user. For example, when receiving a key input for a channel selection from the user, the user interface manager 513 transports the key input signal to the service manager 514.

The service manager 514 controls managers related to a service such as the service delivery manager 504, the service discovery manager 509, the service control manager 503 and the metadata manager 510.

The service manager 514 makes a channel map and selects a channel using the channel map according to the key input received from the user interface manager 513. The service manager 514 receives channel service information for the data decoder 507 and sets audio and video PIDs of the selected channel to the Demux 508.

The service discovery manager 509 provides information necessary to select a service provider which provides services. When receiving a signal for the channel selection from the service manager 514, the service discovery manager 509 searches for a service using the information.

The service control manager 503 selects and controls the service. For example, the service control manager 503 uses the Internet Group Management Protocol (IGMP) or RTSP when the user selects a live broadcasting service which has the same scheme as the prior art, or selects and controls the service using the RTSP when the user selects a service of Video on Demand (VOD).

The RTP may provide a trick mode for the real time streaming. In addition, the service control manager 503 may initialize and manage sessions using an IP Multimedia Subsystem (IMS) through an IMC gateway. The above-described protocols are examples and may be replaced with other protocols.

The metadata manager 510 manages metadata associated with the services and stores the metadata in the SI and metadata DB 511.

The SI and metadata DB 511 and the content DB 506 may be respectively implemented using a nonvolatile RAM (NVRAM) or a flash memory and may also be implemented in logically separated two regions on the same storage area.

The PVR manager 505 is a module for recording and presenting live streaming contents, and may collect metadata for the recorded content and create additional information to be provided to the user such as a thumbnail image or an index.

A function of a controller of the IPTV receiver according to an embodiment may be implemented as divided into a plurality of modules like the TCP/IP manager 502, the service delivery manager 504, a PVR manager 505, the application manager 513 and 514, the service discovery manager 509, the service control manager 503 and the metadata manager 510 as shown in FIG. 20.

For example, the TCP/IP manager 502 may filter SD & S information using the foregoing target package information and control the network interface unit 501 to request only a payload or a segment corresponding to a specific package, for example, a package to which the IPTV receiver is subscribed, to a server and receive the same.

Alternatively, the TCP/IP manager 502 may filter SD & S information received in a multicast scheme using the target package information and cause the decoder 507 to parse and process only a payload or a segment corresponding to a specific package.

Figure 21:
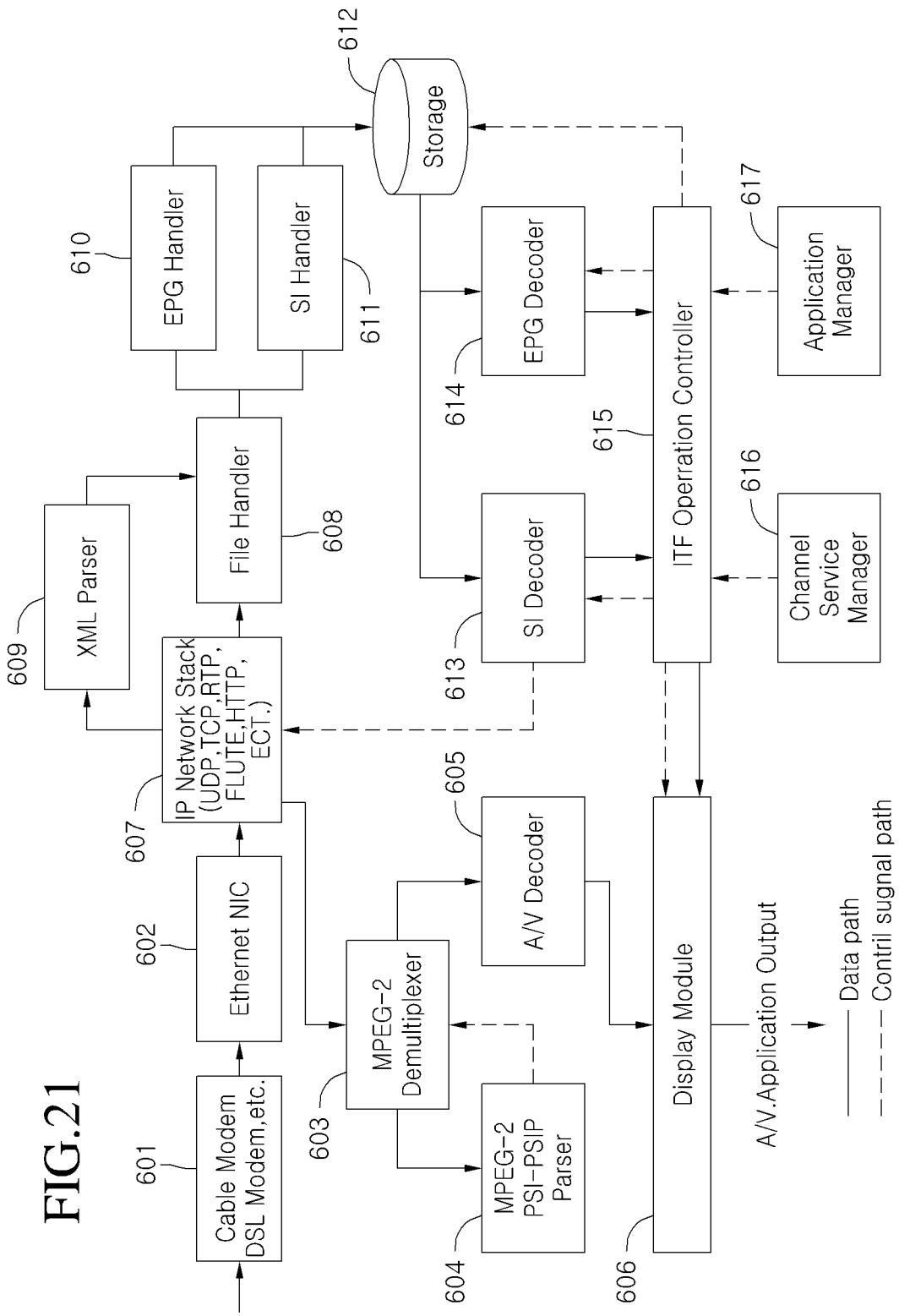
FIG. 21 is a block diagram illustrating a configuration of an IPTV receiver according to a second embodiment of the present invention.

FIG. 21 illustrates a functional block diagram of a configuration of the IPTV according to another embodiment. In FIG. 21, a solid line indicates a data path and a dashed line indicates a control signal path.

A cable modem or a DSL modem, etc 601, which is an interface causing the ITF to connect to an IP network in a physical level, demodulates a signal transmitted through a physical medium and recovers a digital signal.

An Ethernet NIC 602 recovers IP data from a signal received through the physical interface. An IP network stack 607 processes each layer according to the IP protocol stack.

An XML parser 609 parses an XML document from among received IP data. A file handler 608 processes data transported in a file type through FLUTE or the like from among the received IP data.

An SI handler 611 processes a portion corresponding to IPTV service information from among the receive file type data and stores the processed data in a storage 612. An EPG handler 610 processes a portion corresponding to IPTV EPG information from among the receive file type data and stores the processed data in the storage 612.

The storage 612 stores various data such as the SI data and the EPG information data and the like.

An SI decoder 613 reads the SI data from the storage 612, and then, analyzes and obtains channel map information. An EPG decoder 614 analyzes EPG data stored in the storage 612 and recovers information necessary to form an EPG.

An ITF operation controller 615 is a main controller controlling an ITF operation of a channel change or an EPG display.

A channel service manager 616 may perform an operation such as a channel change according to a user input. An application manager 617 may perform an application service such as an EPG display according to a user input.

An MPEG-2 demultiplexer 603 extracts MPEG2 TS data from a received IP datagram and transports the extracted data to a corresponding module according to the PID.

An MPEG2 PSI/PSIP parser 604 extracts the PID of A/V data or PSI/PSIP data including connection information on program elements, and parses the extracted data.

An A/V decoder 605 decodes input audio and video data and delivers the decoded data to a display module 606. The display module 606 displays the decoded A/V data or application.

Hitherto an apparatus and method for transmitting and receiving media data according to embodiments has been described by exemplifying a case where a media file transmitted and received between the transmitting apparatus 100 and the receiving apparatus 300 includes MPEG2 TS data. However, the present disclosure is not limited thereto and may be applied to various transport stream formats besides the MPEG2 TS.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage.

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of transmitting an MPEG2 Transport Stream (TS)-based media file through an Internet Protocol(IP) network, the method comprising:
   mapping a Presentation Time Stamp (PTS) of a Presentation Unit (PU) to a Media Presentation Time (MPT) for synchronization with other media with respect to at least one program element forming a program included in the media file; and
   transmitting synchronization information including the mapped media presentation time together with the media file, wherein the media presentation time is provided for a foremost PU in a segment of the transmitted media file,
wherein the mapping of the PTS is performed by using a following equation, $$MIP_o = ((PTS_1 - PTS_k)/timescale_{PTS}) * timescale + MPT_n$$

where MPT0 denotes the MPT for the first PU, PTS1 denotes the first PTS, PTSk denotes the second PTS, timescalePTS denotes a clock of the PTS, timescale denotes a clock of the MPT, and MPTn denotes an MPT for a second PU.

2. The method according to claim 1, wherein the first and second PUs are included in different program elements belonging to the program.

3. The method according to claim 1, wherein the at least one program element contains discontinuity.

4. The method according to claim 1, wherein the segment is subdivided into a plurality of MPEG2 TS packet groups (MTPGs), wherein the synchronization information further comprises a duration of each of the plurality of MTPGs.

5. The method according to claim 1, wherein the synchronization information further comprises a packet identification (PID) of a program element referenced by the synchronization information.

6. The method according to claim 1, wherein the synchronization information further comprises a PTS of a first PU after a PTS discontinuity occurs in the segment.

7. The method according to claim 1, further comprising:
selecting one program element for performing the mapping of the PTS from among the program elements belonging the program.

8. The method according to claim 1, wherein the transmitting of the synchronization information comprises:
positioning a segment index box including the synchronization information before a mdat box which encapsulates MPEG2 TS data; and
transmitting the segment index box.

9. The method according to claim 8, wherein the transmitted media file further comprises a segment type (styp) box positioned before the mdat box; and
the segment index box is positioned between the stype box and the mdat box.

10. The method according to claim 1, wherein the transmitting of the synchronization information comprises transmitting an extensible markup language (XML) file including the synchronization information.

11. A method of receiving an MPEG2 TS-based media file through an Internet Protocol (IP) network, the method comprising:
receiving the media file with synchronization information;
extracting an MPT of a PU for at least one program element forming a program included in the media file; and
playing back the media file using the extracted media presentation time,
wherein the MPT is mapped from a PTS of a foremost PU in a one of the at least one program element,
wherein the mapping of the PTS is performed by using a following equation, $$MPT_o = ((PTS_1 - PTS_k)/timescale_{PTS}) * timescale + MPT_n$$

where MPT0 denotes the MPT for the first PU, PTS1 denotes the first PTS, PTSk denotes the second PTS, timescalePTS denotes a clock of the PTS, timescale denotes a clock of the MPT, and MPTn denotes an MPT for a second PU.

12. The method according to claim 11, wherein the at least one program element contains discontinuity.

13. The method according to claim 11, wherein the received media file comprises a segment type box, a segment index box including the synchronization information and a mdat box encapsulating MPEG2 TS data.

14. The method according to claim 11, wherein the receiving of the media file comprises receiving an XML file including the synchronization information.

15. The method according to claim 11, wherein the playing back of the media file comprises synchronizing the media file with other media using the MPT.

16. An apparatus for transmitting an MPEG2 TS-based media file through an Internet Protocol (IP) network, the apparatus comprising:
a controller mapping to an MPT a PTS of a foremost PU among PUs included in each segment for synchronization with other media for a program element forming a program included in the media file; and
a network interface unit transmitting synchronization information including the mapped MPT together with the media file,
wherein the mapping of the PTS is performed by using a following equation, $$MPT_o = ((PTS_1 PTS_k)/timescale_{PTS}) * timescale + MPT_n$$

where MPT0 denotes the MPT for the first PU, PTS1 denotes the first PTS, PTSk denotes the second PTS, timescalePTS denotes a clock of the PTS, timescale denotes a clock of the MPT, and MPTn denotes an MPT for a second PU.

17. An apparatus for receiving an MPEG2 TS-based media file through an Internet Protocol (IP) network, the apparatus comprising:
a network interface unit receiving the media file with synchronization information;
a decoding unit decoding the received media file; and
a synchronization unit synchronizing the decoded media file with other media using an MPT included in the synchronization information,
wherein the MPT is mapped from a PTS of a foremost PU in a segment of the received media file,
wherein the mapping of the PTS is performed by using a following equation, $$MPT_o = ((PTS_1 - PTS_k)/timescale_{PTS}) * timescale + MPT_n$$

where MPT0 denotes the MPT for the first PU, PTS1 denotes the first PTS, PTSk denotes the second PTS, timescalePTS denotes a clock of the PTS, timescale denotes a clock of the MPT, and MPTn denotes an MPT for a second PU.

* * * * *

UNITED STATES PATENT AND TRADEMARK OFFICE
CERTIFICATE OF CORRECTION

PATENT NO.       : 9,131,274 B2
APPLICATION NO.  : 13/811198
DATED            : September 8, 2015
INVENTOR(S)      : Kim et al.

It is certified that error appears in the above-identified patent and that said Letters Patent is hereby corrected as shown below:

In The Claims

Column 17, line 5, Claim 1

Delete "$MIP_0=((PTS_1-PTS_k)/timescale_{PTS})*timescale+MPT_n$," and insert --"$MPT_0=((PTS_1-PTS_k)/timescale_{PTS})*timescale+MPT_n$,"--, therefor.

Column 17, line 6, Claim 1

Delete "where MPT0 denotes the MPT for the first PU, PTS1 denotes the first PTS, $PTS_k$ denotes the second PTS..." and insert --"where $MPT_0$ denotes the MPT for a first PU, $PTS_1$ denotes a first PTS, $PTS_k$ denotes a second PTS..."--, therefor.

Column 18, line 1, Claim 11

Delete "where MPT0 denotes the MPT for the first PU, PTS1 denotes the first PTS, $PTS_k$ denotes the second PTS..." and insert --"where $MPT_0$ denotes the MPT for a first PU, $PTS_1$ denotes a first PTS, $PTS_k$ denotes a second PTS..."--, therefor.

Column 18, line 32, Claim 16

Delete "where MPT0 denotes the MPT for the first PU, PTS1 denotes the first PTS, $PTS_k$ denotes the second PTS..." and insert --"where $MPT_0$ denotes the MPT for a first PU, $PTS_1$ denotes a first PTS, $PTS_k$ denotes a second PTS..."--, therefor.

Column 18, line 53, Claim 17

Delete "where MPT0 denotes the MPT for the first PU, PTS1 denotes the first PTS, $PTS_k$ denotes the second PTS..." and insert --"where $MPT_0$ denotes the MPT for a first PU, $PTS_1$ denotes a first PTS, $PTS_k$ denotes a second PTS..."--, therefor.

Signed and Sealed this
Fifteenth Day of March, 2016

Michelle K. Lee
*Director of the United States Patent and Trademark Office*